United States Patent
Lee

(10) Patent No.: US 9,759,294 B2
(45) Date of Patent: Sep. 12, 2017

(54) CHAIN GUIDE STRUCTURE FOR A VEHICLE ENGINE

(71) Applicants: HYUNDAI MOTOR COMPANY, Seoul (KR); Kia Motors Corporation, Seoul (KR)

(72) Inventor: Jong Won Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 127 days.

(21) Appl. No.: 14/819,310

(22) Filed: Aug. 5, 2015

(65) Prior Publication Data

US 2016/0138685 A1 May 19, 2016

(30) Foreign Application Priority Data

Nov. 14, 2014 (KR) .................. 10-2014-0158775

(51) Int. Cl.
*F16H 7/20* (2006.01)
*F16H 7/18* (2006.01)

(52) U.S. Cl.
CPC .............. *F16H 7/20* (2013.01); *F16H 7/18* (2013.01)

(58) Field of Classification Search
CPC ..................... F16H 7/18; F16H 7/20
See application file for complete search history.

(56) References Cited

U.S. PATENT DOCUMENTS

| 6,554,728 | B2 * | 4/2003 | Young, Jr. ............... B62J 13/00 474/140 |
| 7,476,169 | B2 * | 1/2009 | Konno ...................... F16H 7/18 474/111 |
| 2006/0089222 | A1 * | 4/2006 | Nakata ...................... F16H 7/18 474/111 |
| 2011/0218068 | A1 | 9/2011 | Shimosaka et al. |

FOREIGN PATENT DOCUMENTS

| JP | 11-108135 A | 4/1999 |
| JP | 2002-070965 A | 3/2002 |
| JP | 2002-089636 A | 3/2002 |
| JP | 2002-161955 A | 6/2002 |
| JP | 2006-200601 A | 8/2006 |

* cited by examiner

*Primary Examiner* — William E Dondero
*Assistant Examiner* — Robert T Reese
(74) *Attorney, Agent, or Firm* — McDermott Will & Emery LLP

(57) ABSTRACT

The present disclosure relates to a chain guide structure including a guide supporter integrally formed with a chain case and provided with at least a plurality of assembly holes, and a guide body having at least a plurality of assembly protrusions which correspond to the assembly holes for being coupled with the guide supporter, wherein the guide body is provided with a guide wall that is inserted into a space between the guide supporter and a chain. As a result, It is possible to reduce the constituent elements such as bolts, save manufacturing cost, simplify the chain guide structure, and reduce weight or size of the chain guide structure.

5 Claims, 5 Drawing Sheets

CHAIN GUIDE STRUCTURE FOR A VEHICLE ENGINE

CROSS-REFERENCE TO RELATED APPLICATION

This application claims priority to and the benefit of Korean Patent Application No. 10-2014-0158775 filed in the Korean Intellectual Property Office on Nov. 14, 2014, the entire contents of which are incorporated herein by reference.

TECHNICAL FIELD

The present disclosure relates to a chain guide structure for a vehicle engine. More particularly, the present disclosure relates to the chain guide structure which can lighten the weight of an engine or downsize the engine by simplifying itself in order to reduce production costs.

BACKGROUND

In general, a vehicle has a system that converts a chemical energy to a mechanical energy and transmits the mechanical energy which is generated while combusting a fuel in the engine into parts of the vehicle. A timing chain, a timing belt, or a V belt can be used for a transfer method of this driving torque of engine A crankshaft of the engine can be provided with the timing belt or a timing chain in order to open and close an intake valve or an exhaust valve. The timing belt or the timing chain connects the crankshaft with an intake and/or an exhaust camshaft. With this connection, when a crankshaft is rotated, the intake and/or the exhaust camshaft can be rotated together. And the intake valve or the exhaust valve of the engine can be opened and closed. At this time, the timing chain is preferred rather than the timing belt so as to minimize a loss of the driving torque transferring from crankshaft to camshaft.

When the timing chain is applied, a significant vibration can be generated therein. Thus, it is required to mitigate the vibration of the timing chain by installing the chain guide that guides timing chain into a certain route.

A conventional chain guide can be divided into two types. The first type is a combined structure which is combined a steel member with a plastic member. And the second type is a plastic-integrated structure which is formed of plastic only. The combined structure and the plastic-integrated structure should be provided with separate structures or fix equipment in order to secure the chain guide. Moreover, so as to assemble the separate structures or the fix equipment into the chain guide, something like bolts can be required. Accordingly, cost increase is inevitable.

Furthermore, in order to install the conventional chain guide, an additional space for assembling the separate structures or fix equipment may be required. Therefore, a size and a weight of a chain case having the chain guide can be increased.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a chain guide structure having advantages of minimizing a size and a weight as a guide supporter in a circular arc shape is integrally formed with a chain case, and a guide body is assembled between the chain and the guide supporter.

An exemplary embodiment of the present invention provides a chain guide structure including a guide supporter integrally formed with a chain case and provided with at least a plurality of assembly holes; and a guide body having at least a plurality of assembly protrusions which correspond to the assembly holes for being coupled with the guide supporter. The guide body can be provided with a guide wall that is inserted into a space between the guide supporter and a chain.

A cross-section of an assembly hole from the plurality of assembly holes may be in a sector shape which has a central angle of 180 to 270 degrees.

The guide wall may include a sealing portion protruding forward or rearward from an upper end thereof.

One or more recess portions caved and extended upward and downward, can be formed in one side of the guide wall, and the one or more recess portions may be spaced apart from the chain.

The one or more recess portions may be disposed corresponding to the assembly protrusions at the one side of the guide wall.

An upper end of an assembly protrusion from the plurality of assembly protrusions may be lengthily extended in comparison with an upper end of the guide wall.

DETAILED DESCRIPTION OF THE EMBODIMENTS

Figure 1:
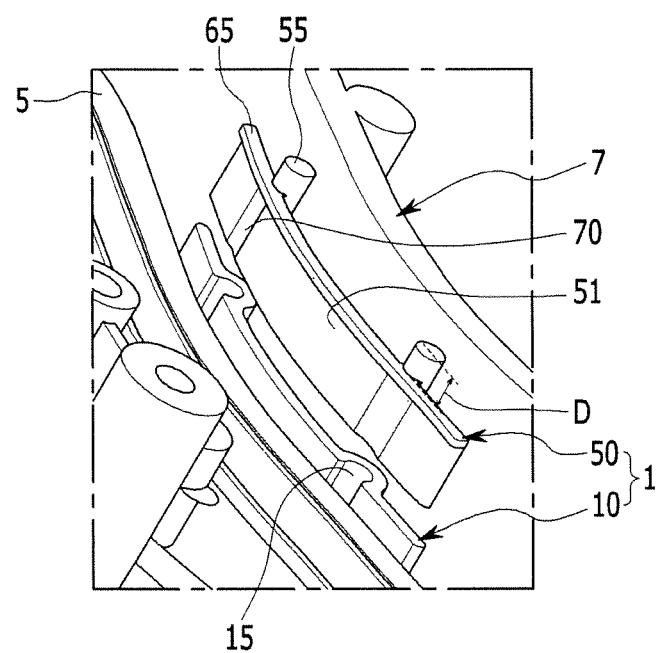
FIG. 1 is a diagram of a perspective view of a chain guide before coupling, according to an exemplary embodiment of the present invention.

An exemplary embodiment of the present invention will hereinafter be described in detail with reference to the accompanying drawings.

Throughout the specification and claims which follow, unless explicitly described to the contrary, the word "comprise" and variations such as "comprises" or "comprising" will be understood to imply the inclusion of stated elements but not the exclusion of any other elements.

For better comprehension and ease of description, a direction which is close to the chain is referred to as "a front surface", "a front portion", "frontward", and the opposite direction is referred to as "a rear side", "a rear portion", "a rearward". In the drawing, it is defined that a direction in which a guide body is inserted is referred to as "downward", "a lower end", "a lower portion", or a similar expression.

Throughout the specification, components denoted by the same reference numerals are the same or similar components.

Figure 2:
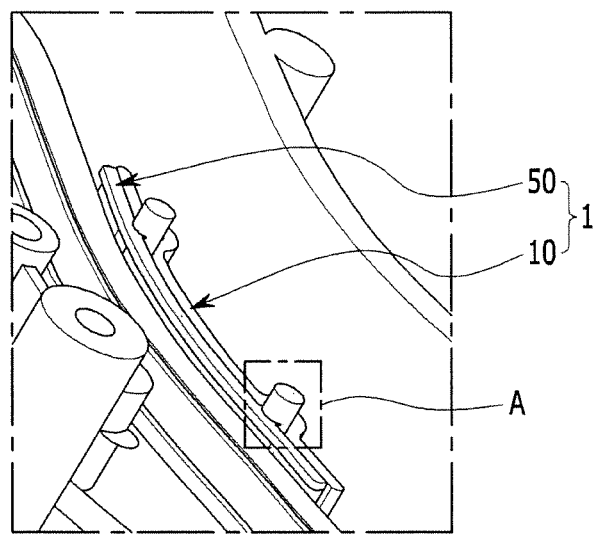
FIG. 2 is a diagram of a perspective view of a chain guide after coupling, according to an exemplary embodiment of the present invention.

FIG. 1 is a diagram of a perspective view of a chain guide before coupling, according to an exemplary embodiment of the present invention, and FIG. 2 is a diagram of a perspective view of a chain guide after coupling, according to an exemplary embodiment of the present invention.

The chain guide structure illustrated in FIG. 1 and FIG. 2 shows one example of various structures of chain guides. However, the spirit of the present disclosure is not restrictively applied to the chain guide described in the present specification but may be applied to various chain guide structures.

As illustrated in FIG. 1 and FIG. 2, a chain guide 1 according to an exemplary embodiment of the present invention serves to guide a chain 5 into certain driving route when the chain is vibrated due to high speed rotation.

The chain guide 1 includes a guide supporter 10 and a guide body 50. In a prior art, a chain guide structure requires steel material having high stiffness or additional plastic material structures. However, in the present disclosure according to the exemplary embodiment, since the guide body 50 is assembled between the guide supporter 10 and the chain 5, the chain guide 1 doesn't require separate structures or bolts to assemble the structures.

The guide supporter 10 can be integrally formed with a chain case 7 which is disposed to surround the chain 5. The chain case 7 can be integrally formed with a cylinder block (not shown) or a part of an engine (not shown).

A front surface of the guide supporter 10 is disposed apart from the chain 5, and the guide body can be inserted into a space between the guide supporter 10 and the chain 5. The guide supporter 10 has multiple assembly holes 15 therein.

The assembly holes 15 are formed in a shape to be caved rearward and extended upward and downward of the front surface of the guide supporter 10. The assembly holes 15 can correspond to assembly protrusions 55 which are formed in the guide body 50.

Figure 3:
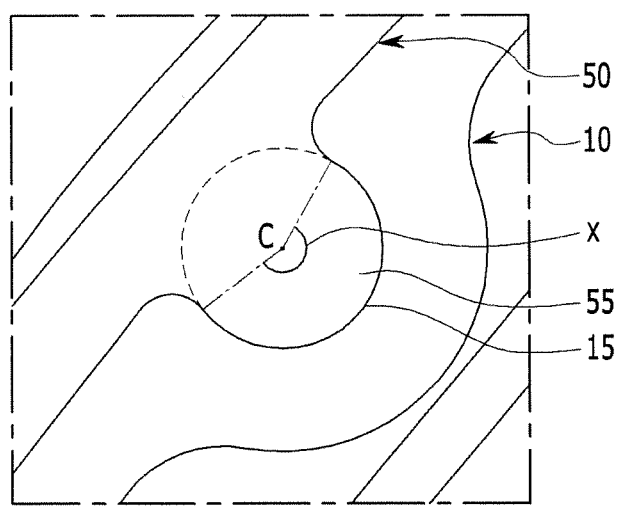
FIG. 3 is a cross-sectional view of a part A of FIG. 2.

FIG. 3 is a cross-sectional view of a part A of FIG. 2.

As illustrated in FIG. 3, each cross-section of an assembly hole 15 which is formed in the guide supporter 10 may be in a sector shape. And a central angle X of the sector can be 180 to 270 degrees around a center point C.

Since the assembly holes 15 have a central angle X over 180 degrees, the guide body 50 can be fixed in the guide supporter 10 to prevent the guide body 50 from escaping frontward or rearward. If the central angle X is below 180 degrees, a problem in that the guide body 50 is not fixed in the guide supporter may occur. If the central angle X is over 270 degrees, the assembly protrusions 55 may be damaged by an impact therein. Therefore, the central angle X may be determined in order to fix the guide body 50 securely and prevent the damage of the assembly protrusion 55. For example, the central angle X may be 180 to 270 degrees. The cross-sections of the assembly holes 15 are not limited in a sector shape. And the assembly holes 15 may be in various shapes so as to fix to the assembly protrusion 55. For example, each cross-section of the assembly holes 15 may be in a "U" or a "trapezoid" shape.

Figure 4:
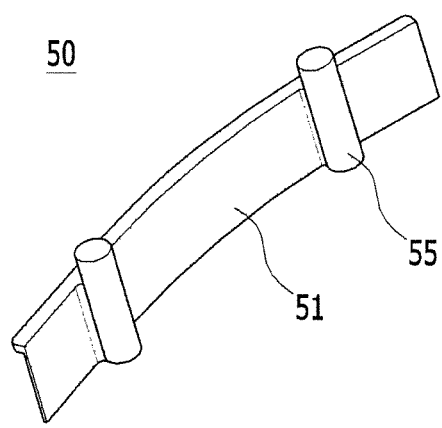
FIG. 4 is a rear perspective view of a guide body, according to the exemplary embodiment of the present invention.
Figure 5:
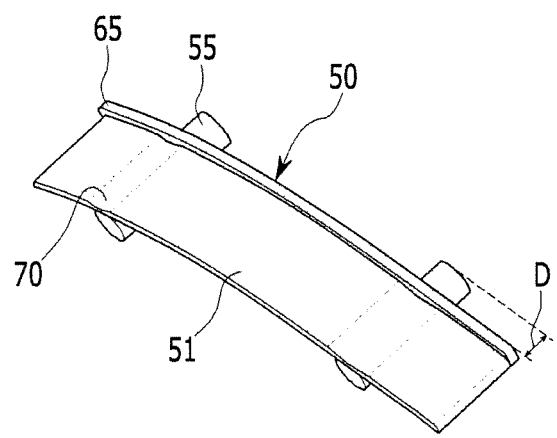
FIG. 5 is a front perspective view of a guide body, according to the exemplary embodiment of the present invention.

FIG. 4 is a rear perspective view of a guide body, according to the exemplary embodiment of the present invention, and FIG. 5 is a front perspective view of a guide body according to the exemplary embodiment of the present invention.

As illustrated in FIG. 4 and FIG. 5, the guide body 50 includes a guide wall 51, the assembly protrusions 55, a sealing portion 65, and a recess portion 70.

A front surface of the guide wall 51 may be substantially in a rectangular shape.

The assembly protrusions 55 being in a shape corresponding to the assembly holes 15 are integrally formed in the rear side of the guide wall 51, which is extended upward and downward. The assembly protrusions 55 are assembled and fixed at the assembly holes 15. Thus, the guide body 50 can be fixed to the guide supporter 10. Each upper end of the assembly protrusions 55 is lengthily extended in comparison with an upper end of the guide wall 51, and a step portion D may be provided. As the step portion D is formed, the guide body 50 may be easily disassembled when the upper and side ends of the assembly protrusions 55 are forced in top and bottom directions.

The sealing portion 65 is formed in a shape which is protruded front ward from a front surface of the upper end of the guide wall 51. The sealing portion 65 serves to prevent external substances from being inserted between the chain 5 and the guide supporter 10.

The recess portions 70 which are caved and extended upward and downward are formed in the front surface of the guide body 50 corresponding to the assembly protrusions 55. The recess portions 70 may be spaced apart from the chain 5. Accordingly, an entire contact area between the guide body 50 and the chain 5 can be reduced. And, a heat and loss of energy by friction between the guide body 50 and chain 5 can be minimized. Also, damage to the assembly protrusions 55 due to stress concentration and heat which is generated, can be prevented. If the recess portions 70 are not formed in the guide body 50, a surface of the guide wall 51 will get in contact with the chain 5. Thus, the guide wall 51 or the assembly protrusions 55 may be damaged by the frictional heat generated and the stress concentration of the assembly protrusions 55. As described above, the guide supporter 10 for inserting the guide body 50 is integrally formed with a chain case 7 (shown in FIG. 1). As a result, it is possible to reduce the constituent elements such as the bolts, save the manufacturing cost, simplify the chain guide structure, and reduce weight or size of the chain guide structure. Moreover, it is convenient to replace the guide body 50 when the guide body 50 is worn down. And as the recess portions 70 are formed in the front side of the guide body 50, the friction between the chain 5 and the guide body 50 may be reduced. Therefore, it is advantageous for preventing the energy loss and the damage of the chain guide 1.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A chain guide structure comprising:
   a guide supporter integrally formed with a chain case and provided with at least a plurality of assembly holes; and
   a guide body having at least a plurality of assembly protrusions which correspond to the assembly holes for being coupled with the guide supporter,
   wherein the guide body is provided with a guide wall that is inserted into a space between the guide supporter and a chain, and
   wherein the guide wall includes a sealing portion protruding forward or rearward from an upper end thereof.

2. The chain guide structure of claim 1, wherein a cross-section of an assembly hole from the plurality of assembly holes is in a sector shape which has a central angle of 180 to 270 degrees.

3. A chain guide structure of claim 1, wherein one or more recess portions caved and extended upward and downward, are formed in one side of the guide wall, and wherein the one or more recess portions are spaced apart from the chain.

4. A chain guide structure of claim 3, wherein the one or more recess portions are disposed corresponding to the assembly protrusions at the one side of the guide wall.

5. A chain guide structure of claim 1, wherein an upper end of an assembly protrusion from the plurality of assembly protrusions is lengthily extended in comparison with an upper end of the guide wall.

* * * * *